Dec. 1, 1942.  R. J. THOMPSON  2,303,713
AIRCRAFT
Filed April 17, 1940   2 Sheets-Sheet 1
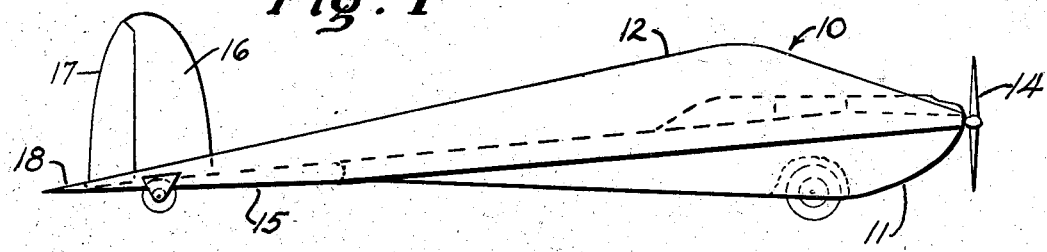
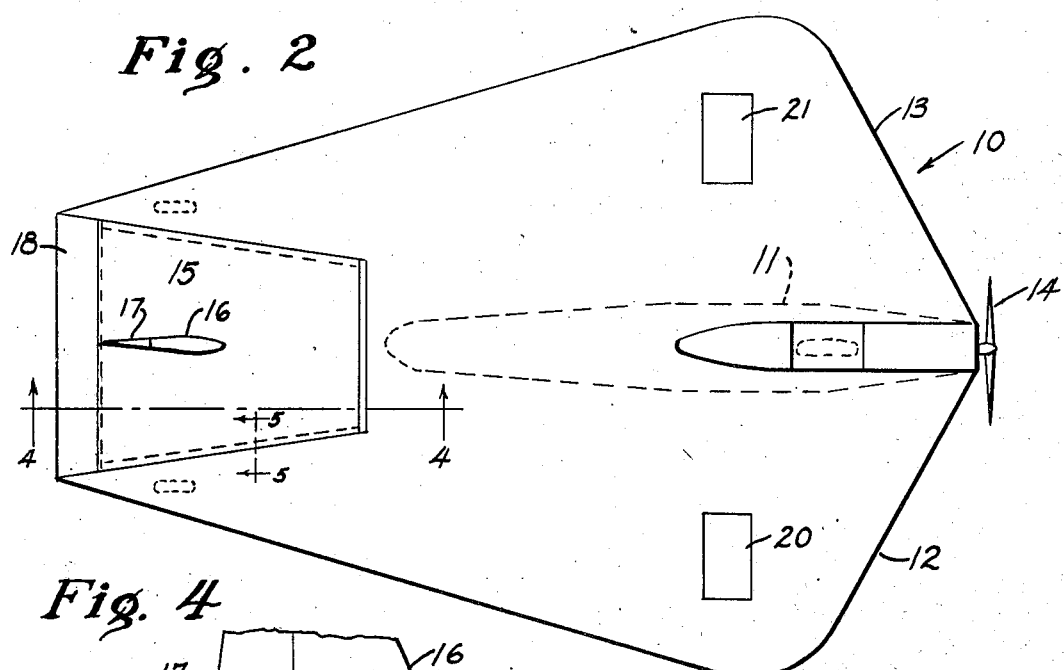
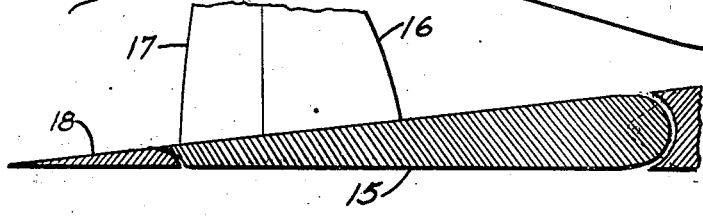
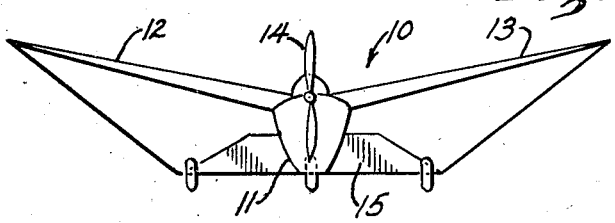
INVENTOR.
Richard J. Thompson
BY
ATTORNEY.

Dec. 1, 1942.  R. J. THOMPSON  2,303,713
AIRCRAFT
Filed April 17, 1940   2 Sheets-Sheet 2
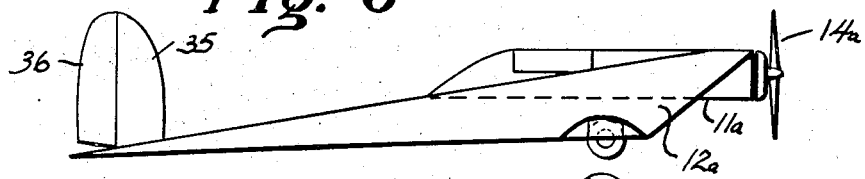
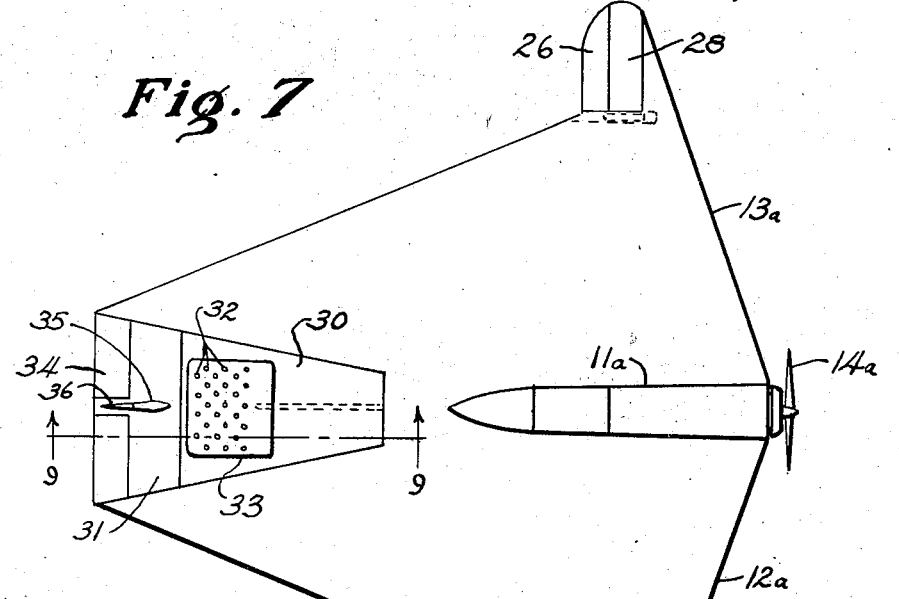
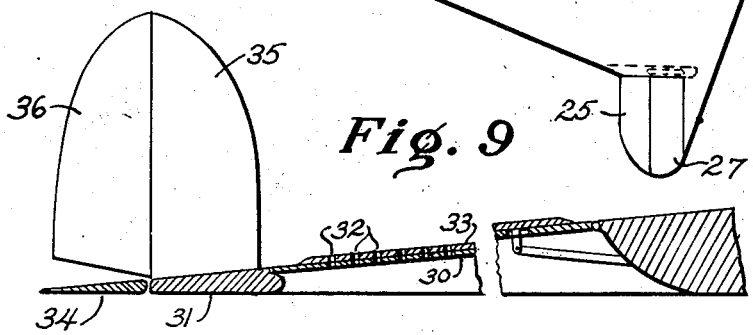
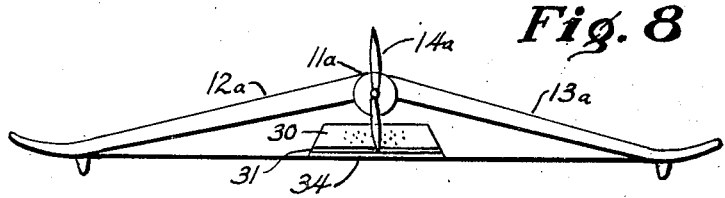
INVENTOR.
Richard J. Thompson
BY
ATTORNEY.

Patented Dec. 1, 1942

2,303,713

UNITED STATES PATENT OFFICE 2,303,713

AIRCRAFT

Richard J. Thompson, Bakersfield, Calif., assignor to C. N. White, Bakersfield, Calif.

Application April 17, 1940, Serial No. 330,067

6 Claims. (Cl. 244—113)

My invention relates generally to aircraft, and more particularly to means for providing greater stability and control in aircraft having an aspect ratio lower than that commonly used, and represents improvements on my Patent No. 2,167,143, issued July 25, 1939.

It is a major object of my invention to provide an airplane which has great inherent stability and which is responsive to the controls at all speeds and at all attitudes.

It is another object of my invention to provide a ship which approaches the highly desirable flying wing form.

It is a further object of my invention to provide an airplane which may easily be internally braced to withstand all forces which may be placed upon it, and which has clean flowing lines producing a minimum of turbulence.

It is still another object of my invention to provide an airplane which has ample storage or cargo space and which, with appropriate design, may be used for either commercial or military purposes.

These and other objects of my invention will become apparent from the following description of two forms thereof, and from the drawings illustrating those forms, in which:

Fig. 1 is a side elevational view of one form of aircraft constructed in accordance with my invention, Fig. 2 is a top plan view of that form, Fig. 3 is a front elevational view of that form, Fig. 4 is an enlarged sectional view taken at 4—4 in Fig. 2, and showing the air brake, elevator, fin, and rudder, Fig. 5 is an enlarged sectional view taken at 5—5 in Fig. 2, and showing the preferred method of shaping the abutting edges of the air brake and wing, Fig. 6 is a side elevational view of an optional form of airplane making use of my invention, Fig. 7 is a front plan view of my optional form, Fig. 8 is a front elevational view of this form, and Fig. 9 is an enlarged sectional view taken at 9—9 in Fig. 6, and showing the optional form of air brake with adjoining elevator, stabilizer, fin, and rudder.

Referring now to the drawings, and particularly to Figs. 1, 2, and 3 thereof, the numeral 10 indicates generally an airplane having a fuselage 11, wings 12 and 13, and a propeller 14 driven by a motor not shown. In my preferred form, the wings 12 and 13 are provided with positive dihedral and some sweep-back to increase its stability. The wings 12 and 13 preferably extend back the entire length of the ship, and at their rear extremities flow into a tail assembly. Suitable ailerons 20 and 21 are provided and are preferably located as shown best in Fig. 2. This tail assembly may take either of two forms, one form now to be described being shown with my preferred form of airplane, and the other form to be described later in conjunction with my optional form of airplane. It is to be understood, of course, that either form of tail assembly may be used with either form of airplane.

In the form of tail surface shown in Figs. 1-5, I provide a pivotally mounted member 15 which I term an "air brake" centered on the longitudinal axis of the airplane, and mounted between the wing surfaces 12 and 13 at the rear of the fuselage 11. The member 15 is pivotally attached at its forward end to the main portion of the airplane; and at its rearward end hydraulic cylinders or other suitable means, not shown, are provided to permit the pilot to raise that end as he desires. The sides of the air brake 15 are bevelled and fit closely against the sides of the wing members 12 and 13 as shown in Fig. 5, so that when the air brake is flush with the wing, a smooth unbroken surface is provided with an absence of passageways or slots through which air may travel from the lower surface to the upper surface of the wing members or air brake.

At the rearward end of the air brake, I provide the customary vertical fin 16 and rudder 17 which are used and adjusted in the conventional manner. Behind the air brake 15 and pivotally supported by the wings 12 and 13, I provide an elevator 18 which is controlled by the "stick" in the usual manner. It will be noted that this form of tail structure omits the use of the conventional stabilizer, and instead, I have provided an air brake 15 which may be used as a stabilizer, but which, as will become apparent, has other uses also. It is to be understood of course that the fuselage and the wing structures flow in to one another, so that a minimum of turbulence is set up which would decrease the efficiency of the airplane.

A blister or totally enclosed cockpit is preferably provided for the pilot, and in keeping with such a design, all parts exposed to the air stream present a minimum of frontal area thereto and are streamlined as much as possible.

In the operation of my aircraft, the air brake 15 is normally left down to act as a stabilizer; and with the air brake in this position, the airplane handles much the same as a conventional plane. However, when it is desired to lose speed rapidly, while at the same time retaining the effectiveness of the control surfaces, the air brake 15 may be elevated and in this position it presents an increased area to the air stream and causes an increased flow of air across the elevator 18, thus preventing loss of vertical control.

In addition, when the air brake 15 is raised, slots are formed between the side edges of the air brake and the abutting edges of the wings 12 and 13, and through these slots air may flow from the lower to the upper surface of the wings. In this way, an additional flow of air is provided over the control surfaces while at the same time, the flow of air through the slots aids in causing the plane to settle vertically. Thus, if it is desired to have the plane descend with very little forward motion, it is only necessary to pull up the nose of the plane until it has nearly reached a stalling attitude, and raise the air brake 15, so that slots are formed between the latter and the wing members 12 and 13. The raising of air brake 15 aids in raising the nose of the ship and in decreasing its forward motion, while the increased flow of air over the elevator prevents that member from losing its control. It will thus be seen that when the forward speed of the plane provides insufficient flow of air over the elevator surfaces, the air brake 15 may be raised, and the resulting increased flow of air over said surfaces will restore to the elevator its control over the airplane. This feature adds greatly to the safety of the plane and increases its ability to land at a very low forward speed, which facilitates landing in small airports.

In Figs. 6, 7, and 8, I have shown an optional form of airplane making use of my invention, which has a fuselage 11a, wings 12a and 13a attached thereto, and a propeller 14a driven by a motor not shown. However, as best seen in Fig. 7, the wings 12a and 13a have a negative dihedral instead of the positive dihedral of my preferred form, and this permits the landing gear to be incorporated within the wings so that streamlining may be accomplished without the necessity of providing retractable landing gear. In such a form, fuel tanks may often be advantageously placed in the outer and lower portions of the wings. I have illustrated this form of my invention as provided with aileron control surfaces 25 and 26 located at the tips of the wings, and having stabilizing surfaces 27 and 28, preferably controlled by the torque of the motor as disclosed in my copending application, Serial No. 330,068, filed April 17, 1940. It will be apparent, of course, that any other suitable type of aileron may be used, if desired.

As in my preferred form, the wings 12a and 13a are provided with a certain degree of sweep-back and extend rearwardly to joint with the tail structure, so that there are no breaks between the wings, fuselage, and tail assembly.

The tail assembly I have shown on my modified form of airplane is somewhat different from that shown with my preferred form, though as previously mentioned, it is to be understood that either form of tail assembly may be used with either form of airplane. In this optional form of tail assembly, shown best in Fig. 9, I provide a relatively thin sheet-like air brake 30 whose side edges rest upon the sides of the wing members 12a and 13a and whose rear edge rests upon a stabilizer 31. The stabilizer 31 performs the same function as the conventional stabilizer, and is mounted between and supported by the rear portion of the wing members 12a and 13a. The air brake 30 covers a generally trapezoidal opening between the two wings, having a base formed by the stabilizer 31. The air brake 30 is provided with a hydraulic cylinder or other suitable means at its rear end, and is pivotally supported at its forward end so that the pilot may raise it when desired. It will be apparent that as soon as the rear end of the air brake 30 is raised, openings will be formed between the air brake and the wing members 12a and 13a, and these openings act as do the slots in my previously-described form.

In addition, I may provide a number of holes 32 near the rear of the brake member, extending from the upper to the lower surface thereof, and covered by a slidable plate 33 having similarly aligned holes so that the holes in the air brake may be covered or uncovered by movement of the plate which is under the control of the pilot. When the holes 32 are open, they produce the same effect as the slots formed at the sides of the air brake by permitting an even greater flow from one surface to the other. Thus by raising the air brake 30 and by opening the holes 32, very efficient retarding means are provided and the airplane may be caused to settle with very little forward motion and without losing control.

As previously mentioned, in this form of tail assembly, I provide a stabilizer 31 mounted between the wings 12a and 13a and adjustable in the customary manner to enable the pilot to trim the airplane. At the rear of the stabilizer 31, I provide an elevator 34 of the customary type controlled in the usual manner, and extending upwardly from the middle of the stabilizer 31 I provide the conventional vertical fin 35 and rudder 36. It will be seen that inasmuch as the stabilizer is not connected to the air brake 30, when the latter is raised, there will be an increased flow of air over both the stabilizer and elevator 34.

By providing a separate stabilizer, the operation of the airplane is somewhat simplified, since the statbilizer may be set to the proper position and left there, and the air brake 30 may then be positioned as required without the necessity of seeing to it that the air brake is returned to its proper position to give the necessary trim to the airplane.

It is to be understood that the stabilizer may be used with either the thicker form of air brake first described and which fits down in between the wings, or with the thinner form last described. In addition, the holes in the air brake may be used in the thicker form first described, as well as in the thinner form, and if desired, the thinner form may be used without a stabilizer. It is also to be understood that any suitable airfoil section may be used to form the wings of the plane, and that the wings may have either positive or negative dihedral or no dihedral at all.

While I have shown and described a preferred and modified form of my invention, I do not wish to be limited to the particular form or arrangement of parts herein described and shown or particularly covered by my claims.

I claim as my invention:

1. An airplane of the class described which includes: a fuselage; a pair of outwardly-extending wings which extend rearwardly to a tail assembly; control surfaces pivotally mounted at the rear of said wings; and an air brake pivotally attached at its forward edge to said wings and mounted between them in abutting position so that when the rear edge of said brake is raised, an increased flow of air over said control surfaces will be had.

2. A device as described in claim 1 which includes means for raising the rear edge of said brake.

3. A device as described in claim 1 in which said brake has holes extending from the lower to the upper surface thereof, and is provided with a means to open or close said holes.

4. In an aircraft, the combination of: a fuselage; wings projecting latererally from said fuselage and extending rearwardly thereof; a braking member between said wings and rearwardly of said fuselage, said braking member normally being in a substantially horizontal plane and closing the space between said wings; control surfaces mounted between said wings and rearwardly of said braking member; and means for vertically raising the rear end of said braking member whereby an increased amount of air will flow over said control surfaces.

5. In an aircraft, the combination of: a fuselage; wings projecting laterally from said fuselage and extending rearwardly thereof; a braking member between said wings and rearwardly of said fuselage, said braking member normally being in a substantially horizontal plane and closing the space between said wings, and having a series of holes extending from the lower to the upper surface of said member; movable means controllable to open or close said holes, whereby air may be permitted to flow from the lower to the upper surface of said braking member; control surfaces mounted between said wings and rearwardly but independently of said braking member; and means for vertically raising the rear end of said braking member whereby the flow of air over said control surfaces is increased, and air will flow through the slots thus formed between said braking member and said wings.

6. In an aircraft, the combination of: a fuselage; wings projecting laterally from said fuselage and extending rearwardly thereof; a substantially plane braking member between said wings and rearwardly of said fuselage, said braking member normally being in a substantially horizontal plane and closing the space between said wings, and provided with a series of holes extending substantially vertically through it; movable means controllable to open or close said holes whereby air may be permitted to flow through said braking member; control surfaces mounted between said wings and rearwardly of said braking member but independently of the latter; and means for vertically raising the rear end of said braking member whereby the substantially continuous surface extending from one wing to the other and from said fuselage to said control surfaces may be destroyed, the flow of air over said control surfaces will be increased, and air will flow through the slots thus formed between said braking member and said wings.

RICHARD J. THOMPSON.